US006577304B1

(12) United States Patent
Yablonski et al.

(10) Patent No.: US 6,577,304 B1
(45) Date of Patent: Jun. 10, 2003

(54) SYSTEM AND METHOD FOR VISUALLY REPRESENTING A SUPPLY CHAIN

(75) Inventors: Mark S. Yablonski, Allen, TX (US); John Robbins Bush, Jr., Dallas, TX (US); James R. Wilson, Duluth, GA (US); Weylin J. Debetaz, Plano, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/374,461

(22) Filed: Aug. 13, 1999

Related U.S. Application Data

(60) Provisional application No. 60/096,518, filed on Aug. 14, 1998.

(51) Int. Cl.[7] ................................................ G06F 17/00
(52) U.S. Cl. ...................... 345/419; 345/848; 345/782; 705/7; 705/8; 705/28; 705/29
(58) Field of Search ................................. 345/848, 782, 345/851, 419; 705/7, 10, 28, 8, 29

(56) References Cited

U.S. PATENT DOCUMENTS 4,161,330 A    7/1979   Ross .......................... 283/55
5,237,497 A    8/1993   Sitarski ...................... 364/402
5,615,109 A    3/1997   Eder .......................... 395/208
5,859,623 A  * 1/1999   Meyn et al. ................. 345/698
5,946,662 A  * 8/1999   Ettl et al. ................... 705/14
6,008,808 A  * 12/1999  Almeida et al. ............. 345/767
6,104,410 A  * 8/2000   Wong ......................... 345/440
6,137,499 A  * 10/2000  Tesler ........................ 345/440

FOREIGN PATENT DOCUMENTS

| EP | 0770967 A2 | 5/1997 | ........... G06F/17/60 |
| WO | 95/24114 | 9/1995 | |
| WO | 97/42589 | 11/1997 | ........... G06F/17/60 |

* cited by examiner

Primary Examiner—Kristine Kincaid
Assistant Examiner—Sajeda Muhebbullah
(74) Attorney, Agent, or Firm—Baker Botts L.L.P.

(57) ABSTRACT

A computer-related system for visually representing a supply chain includes a supply chain physical window (12). The supply chain physical window (12) displays a plurality of supply chain entities (24), at least one supply chain bar (28) adjacent a corresponding supply chain entity (24), and at least one connector (26) between two of the supply chain entities (24). The supply chain bar (28) provides data related to the adjacent supply chain entity (24), and the connector (26) represents product flow between the two supply chain entities (24).

50 Claims, 3 Drawing Sheets

SYSTEM AND METHOD FOR VISUALLY REPRESENTING A SUPPLY CHAIN

RELATED APPLICATIONS

This application claims the benefit of U.S. Provisional Application No. 60/096,518 entitled "System and Method for Visual Representation of a Supply Chain," filed Aug. 14, 1998.

This application is related to U.S. application Ser. No. 09/397,423 entitled "System and Method for Displaying Planning Information Associated with a Supply Chain," filed Sep. 17, 1999, and U.S. application Ser. No. 09/397,473 entitled "System and Method for Displaying Logistics Information Associated with a Supply Chain," filed Sep. 17, 1999.

TECHNICAL FIELD OF THE INVENTION

This invention relates generally to the field of supply chain management and, more particularly, to a system and method for visually representing a supply chain.

BACKGROUND OF THE INVENTION

Computer implemented planning and scheduling systems are widely used for factory, enterprise, and supply chain planning functions. In general, such systems can model manufacturing or other environments and provide plans or schedules for producing items to fulfill consumer demand within the constraints of the environment. A supply chain can be defined as the collection of suppliers, factories, distribution centers, and customers of a company or set of companies that bring products from production to market.

SUMMARY OF THE INVENTION

In accordance with the present invention, a system and method for visually representing a supply chain reduce or eliminate problems associated with supply chains.

According to one embodiment of the present invention, a computer-related system for visually representing a supply chain includes a supply chain physical window. The supply chain physical window displays a plurality of supply chain entities, at least one supply chain bar adjacent a corresponding supply chain entity, and at least one connector between two of the supply chain entities. The supply chain bar provides data related to the adjacent supply chain entity, and the connector represents product flow between the two supply chain entities.

The system and method of the present invention provide a number of important technical advantages. The present invention provides a visual representation that is updated when a supply chain plan is changed through manual or automated replanning or rescheduling. Furthermore, within the visual representation, a user may call an underlying planning or scheduling engine to resolve a problem or manually manipulate the plan. In addition, graphical windows are coordinated to respond to commands generated using other windows.

In addition, a supply chain physical window may display an entire supply chain and show data about the supply chain in either two-dimensions or three-dimensions. The physical window includes supply chain entities and supply chain connectors providing data related to product flow between entities. Supply chain bars provide data associated with the supply chain entities and connectors. The physical window may provide geographical, logical, or combined views of the supply chain and is navigable to allow a user to see various views and depths of detail. The physical window may animate the supply chain over time using the bar data, may show how a product moves through the supply chain by highlighting supply chain entities, connectors, or bars affecting the product, and may display pop-up windows that show data associated with selected supply chain entities, connectors, or bars.

With these advances, a supply chain planner or scheduler can more effectively understand the dynamic problems and performance issues associated with the supply chain through a complete visualization, and can better solve and optimize the plan or schedule. Additional technical advantages will be readily apparent to those skilled in the art.

BRIEF DESCRIPTION OF THE DRAWINGS

To provide a more complete understanding of the present invention, and further features and advantages thereof, reference is now made to the following description taken in conjunction with the accompanying drawings, in which.

DETAILED DESCRIPTION OF THE INVENTION

Figure 1:
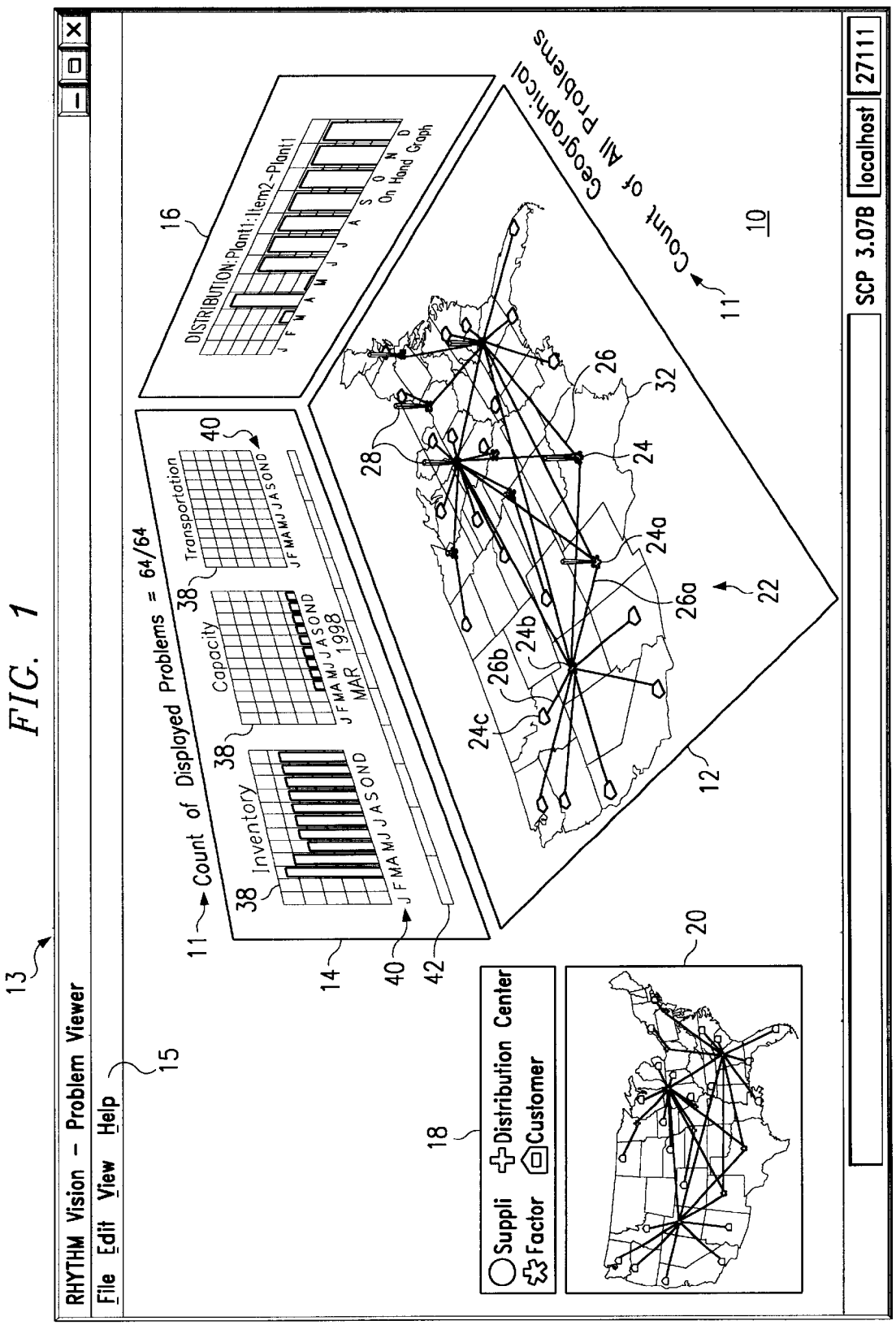
FIG. 1 illustrates an exemplary visual representation of a supply chain in geographical mode according to the present invention.

FIG. 1 illustrates an exemplary visual representation 10 of a supply chain. Visual representation 10 may include, without limitation and in any suitable combination, a supply chain physical window 12, a supply chain data summary window 14, a supply chain data details window 16, a legend 18, and a top view window 20. The information content of visual representation 10 is generated according to data associated with a plan or schedule for the supply chain. In a particular embodiment, the RHYTHM family of products available from 12 TECHNOLOGIES generates the data according to a plan or schedule for the supply chain. As described below, visual representation 10 provides a coordinated display of the supply chain using physical window 12, data summary window 14, and data details window 16.

Visual representation 10 may be presented using a computer, work station, personal digital assistant, or any other processing or communications device that generates a visual output using an associated output device. A user may interact with visual representation 10 by manipulating a keyboard, mouse, touch-screen, voice recognition device, or any other suitable input device or user interface. Visual representation 10 appears on an output device within at least one application window 13. Application window 13 may include a menu bar 15 for displaying commands that may be used to manipulate visual representation 10.

In a particular embodiment, a user may select a problem view, an operational view, or a profit view of visual representation 10. The problem view provides data relating to problems in the plan or schedule of the supply chain; the operational view provides data relating to inventory, capacity, and transportation resources; and the profit view provides data relating to profit and expenses throughout the supply chain. Within each view, a user may also select a sub-view. For example, the problem view may include sub-views for displaying problems in different units or according to different problem characteristics, such as a number-of-problems subview, a severity-of-problems subview, and a cost-of-problems subview. As indicated by arrows 11, visual representation 10 in the illustrated embodiment is a number-of-problems subview of the supply chain. Although visual representation 10 is described predominantly in relation to the illustrated number-of-problems sub-view, visual representation 10 may display information related to a supply chain in the operational view, profit view, or any other suitable view without departing from the scope of the present invention.

Supply chain physical window 12 displays a physical representation 22 of the supply chain, including supply chain entities 24 and connectors 26. Supply chain entities 24 may be suppliers, factories, distribution centers, customers, or any other suitable entity affecting the flow of a product within a supply chain. Supply chain physical window 12 may represent supply chain entities 24 using one or more icons. In the illustrated embodiment, physical window 12 displays factories 24a, distribution centers 24b, and customers 24c using different icons for each type of supply chain entity 24. Legend 18 relates one or more icons to the different types of supply chain entities 24. As legend 10 indicates for exemplary physical representation 22 of FIG. 1, which does not include supplier entities 24, not every supply chain or supply chain visual representation 10 includes all types of available entities 24.

In geographical mode, physical window 12 displays supply chain entities 24 using an input map 32 of an appropriate geographic area. Physical window 12 displays supply chain entities 24 according to their geographic locations on input map 32. Input map 32 may include cities, states, countries, or any other suitable geographic features. In the illustrated embodiment, input map 32 is the contiguous United States.

Physical window 12 displays one or more supply chain bars 28 adjacent to corresponding supply chain entities 24. Supply chain bars 28 provide data relating to adjacent entities 24. Physical window 12 may adjust the height of bars 28 according the data relating to adjacent entities 24. For example, in the illustrated embodiment, physical window 12 displays bars 28 with heights determined according to a number of problems associated with adjacent entities 24. In alternative embodiments, bars 28 may have heights determined according to data related to the operation, profits, or any other suitable feature associated with the supply chain. In a particular embodiment, a user may manipulate a scale input to control the height of bars 28. The user may increase the scale, decrease the scale, reset the scale to an original default setting, or manipulate the scale in any other suitable manner. Although bars 28 appear as rectangular projections in the illustrated embodiment, the present invention contemplates that bars 28 may appear as profiles, figures, contours, forms, shapes, or any other suitable projections or extensions according to particular needs.

In addition to adjusting the heights of bars 28, physical window 12 may change one or more other characteristics of supply chain bars 28 in response to the data relating to adjacent entities 24 exceeding a threshold. For example, in the illustrated embodiment where supply chain bars 28 depict a number of problems associated with adjacent entities 24, physical window 12 may change the color or brightness of bars 28 in response to the number of problems associated with adjacent entities 24 exceeding a threshold number of problems. Physical window 12 may simultaneously use different characteristics of bars 28 to communicate different types of data. For example, in a particular embodiment, a color of bar 28 may relate to a number of problems associated with adjacent entity 24, and a brightness of the color may relate to the severity of problems associated with adjacent entity 24.

Connectors 26, appearing between two suitably related supply chain entities 24, represent product flow between the two supply chain entities 24. For example, in the illustrated embodiment, connector 26a between factory 24a and distribution center 24b represents the flow of one or more products manufactured at factory 24a to distribution center 24b. Similarly, connector 26b between distribution center 24b and customer 24c represents the flow of one or more products stored at distribution center 24b to customer 24c. In a particular embodiment, connectors 26 represent transportation resources causing one or more products to flow between two supply chain entities 24. Connector 26 may appear as a line, arrow, or any other graphic representation suitable for associating two supply chain entities 24.

In a particular embodiment, physical window 12 may display supply chain bars 28 associated with connectors 26 to provide data relating to the product flow represented by connectors 26. For example, in a particular embodiment, a supply chain bar 28 (not explicitly shown) associated with connector 26b may represent an amount of trucking resources needed to accommodate shipments scheduled between distribution center 24b and customer 24c. Physical window 12 may display bars 28 associated with connectors 26 in a variety of ways. In a particular embodiment, physical window 12 displays bars 28 as graphical bars adjacent connectors 26 as described above in conjunction with supply chain entities 24. In another embodiment, physical window 12 displays bars 28 associated with connectors 26 as raised lines with heights determined according to the data related to the product flow. For purposes of visual clarity, physical window 12 may raise only a specified segment of the line for connector 26. In still another embodiment, physical window 12 may display bars 28 associated with connectors 26 as cylinders with diameters determined according to the data related to the product flow.

In response to input from a user, physical window 12 may zoom-in on a portion of physical representation 22 to show supply chain entities 24, connectors 26, or bars 28 in greater detail. In a particular embodiment, as a result of a zoom-in operation, supply chain physical window 12 adds numerical data to physical representation 22 and splits at least one of supply chain bars 28 into multiple bars 28. For example, in the illustrated embodiment where bars 28 depict a number of problems associated with adjacent entity 24, physical window 12 may split bars 28 into multiple side-by-side bars 28 separately depicting various categories of problems, such as inventory problems (e.g., the raw items at an assembly plant may be supplied too late to fulfill an order on time), capacity problems (e.g., machine over-utilization) and transportation problems (e.g., no trucks are available to move the items at the required time). In a particular embodiment, each side-by-side bar 28 depicting a separate category of problems may again split into multiple bars 28 depicting more detailed types of problems. For example, in such an embodiment, inventory problems may include stockouts, safety stock violations, max exceeded, replenishment policy violation, and other inventory problems; capacity problems may include resource overloaded, resource underloaded, overtime scheduled, and other capacity problems; and transportation problems may include unconsolidated distribution lanes, unconsolidated delivery lanes, uncoordinated shipments, consolidation oversize, consolidation undersize, and other transportation problems.

Furthermore, a user may zoom-in on one of supply entities 24 to view a detailed three dimensional rendering of selected supply entity 24. For example, if supply entity 24 is a factory, the user could drill down to view a detailed three-dimensional rendering of its production lines, or if supply entity 24 is a distribution center, the user could view product flow components. Physical window 12 may also zoom-out from a portion of physical representation 22 to show less detail. In a particular embodiment, as a result of a zoom-out operation, physical window 12 may remove numerical data from physical representation 22 and consolidate multiple side-by-side bars 28 into aggregate supply chain bars 28 according to the level to which physical representation 22 is taken as a result of the zoom-out operation.

Physical window 12 modifies the display of entities 24, connectors 26, and bars 28 according to various filtering commands. For example, in the illustrated embodiment, physical window 12 may restrict supply chain bars 28 to any combination of the inventory, capacity, transportation, or customer service (not explicitly shown) problems. Within these broad problem categories, physical window 12 can further filter the data to display, as merely examples, only the inventory problems for specific items or only the capacity problems for specific types of machines. Furthermore, supply chain physical window 12 can filter out any set of entities 24, connectors 26, or bars 28 that exceeds, or fails to meet, specified tolerances. Physical window 12 may also display how a product moves through the supply chain by highlighting only entities 24, connectors 26, or bars 28 associated with the product or with a problem relating to the product.

In addition to the problem view of the illustrated embodiment, physical window 12 may use supply chain bars 28 to display information relating to other views of a supply chain. For example, in an operational view, supply chain bars 28 may display inventory levels or capacity usage levels. For capacity usage levels, bars 28 may be double-colored to show the available capacity and the utilized capacity. In addition, physical window 12 may use positive bars 28 above the plane of map 32 and negative bars 28 under the plane of map 32 to show, for example, under-utilization percentages or over-utilization percentages, respectively. Bars 28 may also show the delta from average long-term utilization, from demanded long-term utilization, from goal utilization levels, or from other utilizations. For the profit view, bars 28 may show utilization of budgets, target versus actual revenue, costs to run, costs of scrap, quality ratings, customer satisfaction survey results, or any other suitable measure or estimate of cost or profit.

Supply chain data summary window 14 displays a summary of data relating to the supply chain represented by supply chain entities 24 and connectors 26. To allow a user to better understand and remedy problems in the supply chain, data summary window 14 displays data relating to the supply chain over a specified period of time. In a particular embodiment, data summary window 14 presents one or more charts 38 depicting data relating to all entities 24 and connectors 26. For example, in the illustrated embodiment, charts 38 display the total number of inventory problems, capacity problems, and transportation problems in the supply chain per month over a year. Although in the illustrated charts 38 display data according to months, charts 38 may be divided into years, months, weeks, days, or any other suitable time unit 40.

Data summary window 14 also includes a time line 42 that allows users to select a specific time period for display of data. In the illustrated embodiment, time line 14 is a row of boxes corresponding to various time periods. In response to a user selecting a time period from time line 14, supply chain bars 28 in physical window 12 display data for the selected time period. For example, in the illustrated embodiment, if a user selects a particular month from time line 14, bars 28 adjacent to entities 24 and connectors 26 may display a total number of problems for the selected month and, if physical window 12 is zoomed-in on entities 24 and connectors 26, bars 28 may depict a number of inventory problems, capacity problems, transportation problems, and customer service problems for the selected month. This filtering of data by time period gives a user a powerful mechanism for visualizing the plan or schedule of the supply chain over time. A user can point to or otherwise select various months to see which physical locations have the most problems and when those problems occur. For instance, a user may observe that a significant portion of a supply chain's capacity problems in June are due to the capacity problems of one factory in May and June. By clicking on April and other preceding months, the user may discover from further investigation that specific suppliers with inventory shortages contributed to the glut of work that arrived at the factory in May and June. This ability to navigate the supply chain to understand and resolve planning problems provides significant advantages to users.

Visual representation 10 may also present an animated supply chain by displaying data for a time period and, after a brief amount of time, automatically displaying data for a next chronological time period. This animation allows a user to visualize changes in the supply chain over time. The time periods may be years, months, weeks, days, or any other suitable time period. In a particular embodiment, a user may control the speed of the animation by changing the amount of time between changes in the display. This animation provides a major advantage for understanding the flow of materials within a supply chain and the effect of particular supply chain plans and schedules. Using such animation, a user can see problems surface and disappear over time and over different parts of the supply chain. In addition, a user can rerun an animation numerous times to build an understanding of the operation of the supply chain over time.

Supply chain data details window 16 displays data related to one or more supply chain entities 24 or connectors 26 selected by a user. In a particular embodiment, a user selects entity 24 using a pointer device in physical window 12. In response to selecting entity 24, data details window 16 displays data related to selected entity 24. In the illustrated embodiment, because visual representation 10 is in a problem view, data details window 16 displays various categories of problems associated with selected entity 24. The categories of problems may include capacity, inventory, transportation, customer service, or any other problem category. Within each category, a user may select more detailed levels of information. For example, in the illustrated embodiment, if a user selects capacity problems, data details window 16 may display different types of capacity problems, such as space problems, resource over-utilization problems, delinquent preventive maintenance problems, or any other suitable capacity problems. Similarly, data details window 16 may provide different types of inventory problems, such as shortages of items, and different types of transportation problems, such as shipments exceeding the size of the scheduled trucks, unscheduled shipments, and shipments using non-preferred modes of transportation. Under each type of problem, data details window 16 may provide specific instances of problems. For example, under resource over-utilization, data details window 16 may list a problem at a pressing machine in the beginning of June or two problems at a folding machine near the end of June. While summary window 14 aggregates information to simplify the complexity of the supply chain, data details window 16 provides a way for a user to dig further into the supply chain to discover data specific to entities 24 and connectors 26.

Visual representation 10 can be integrated with an underlying planning or scheduling engine (such as a RHYTHM scheduling engine available from 12 TECHNOLOGIES) to provide a highly effective method of planning. When a user digs down into detailed data, such as individual problems, the user can make calls to an underlying planner or scheduler. For example, after discovering a specific problem in data detail window 16, the user can command a planning or scheduling engine to modify a plan or schedule to resolve the problem. The user can examine the operations that contribute to the problem (e.g., the work scheduled at an over-utilized resource) and reschedule the operations manually so as to eliminate or reduce the severity of the problem. After each such call, visual representation 10 may update all displays, including physical window 12, data summary window 14, and data details window 16, to give the user a fresh view of the planned supply chain. The coordination of the data shown by windows 12, 14, and 16 along with the external calls to the underlying planning or scheduling engine provide a significant advance in supply chain planning technology for the user. Although the illustrated embodiment of visual representation 10 includes physical window 12, data summary window 14, and data details window 16, the present invention contemplates that visual representation 10 may include physical window 12, either alone or in combination with one or both data summary window 14 and data details window 16 according to particular needs.

Figure 2:
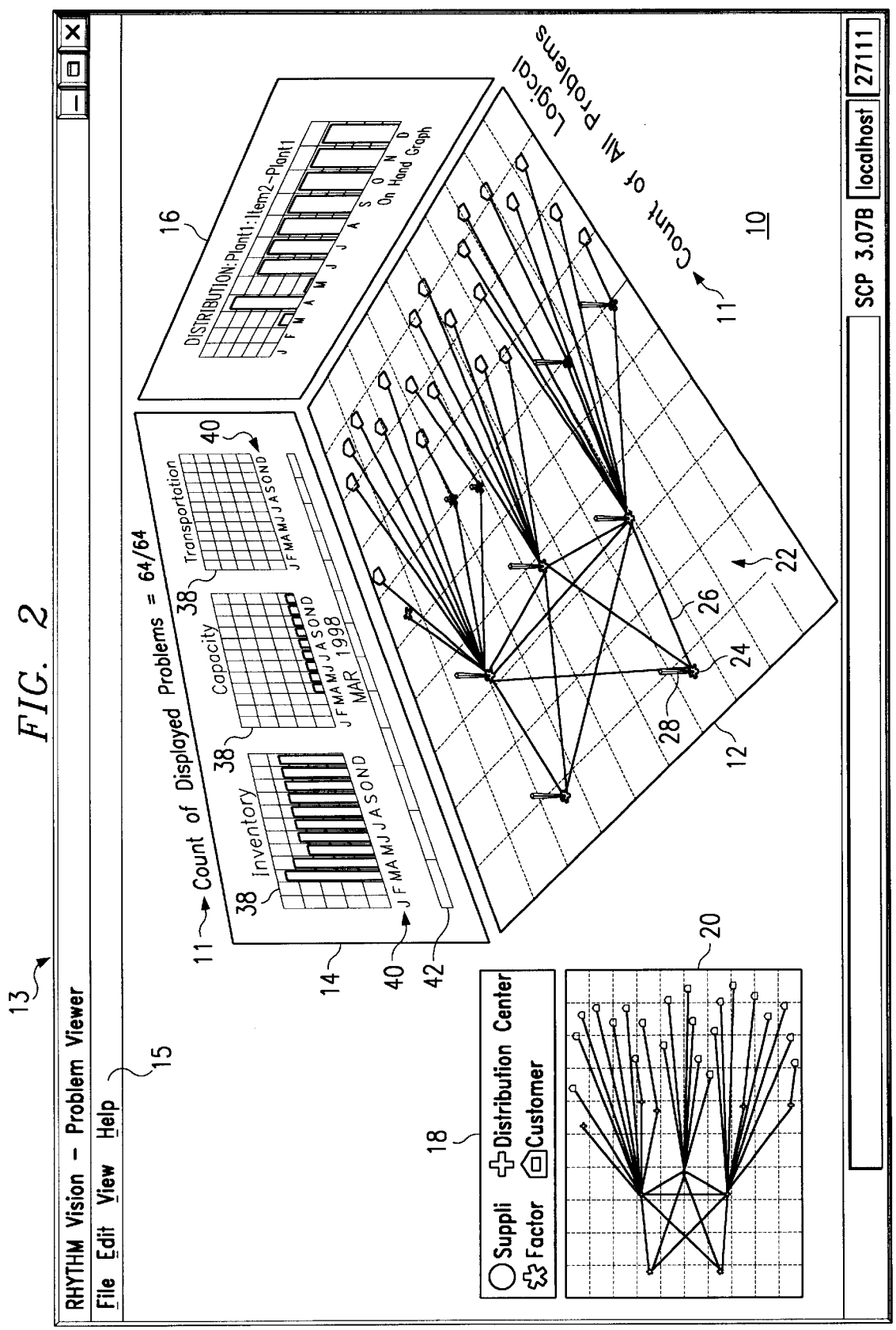
FIG. 2 illustrates an exemplary visual representation of a supply chain in logical mode according to the present invention.

FIG. 2 illustrates an exemplary visual representation 22 of the supply chain in logical mode. Physical window 12 and top view window 20 display supply chain entities 24 and supply chain connectors 26 using a different visual organizational structure than that depicted in the geographical mode of FIG. 1. Neither physical window 12 nor top view window 20 include input map 32 of a geographic region. Rather, physical window 12 and top view window 20 display supply chain entities 24 according to the logical flow of products within the supply chain. For example, in the illustrated embodiment, factories 24a, distribution centers 24b, and customers 24c are arranged generally from left to right according to the flow of products within the supply chain.

Although a geographical and logical mode are described in detail, physical window 12 may display supply chain entities 24, connectors 26, and bars 28 in a variety of ways without departing from the scope of the present invention. For example, in an alternative embodiment, physical window 12 may combine geographical and logical modes to produce a combined mode. In the combined mode, physical window 12 displays two or more input maps 32 of a geographic region, and each supply chain entity 24 appears on at least one of input maps 32 according to the product flow within the supply chain. In a particular embodiment, physical window 12 stacks input maps 32 generally vertically on top of each other as planes and places a different type of supply entity 24 on each map 32. For example, factories 24a may appear on a top map 32, distribution centers 24b may appear on a middle map 32, and customers 24c may appear on a bottom map 32. Connectors 26 between maps 32 represent product flows between supply chain entities 24 on different maps 32. In such an embodiment, connectors 32 may change colors according to the orientation of maps 32 so as to interfere less with other graphical displays, such as supply chain bars 28. Using a combined mode, a user can better understand the logical and geographical flow of the supply chain.

Figure 3:
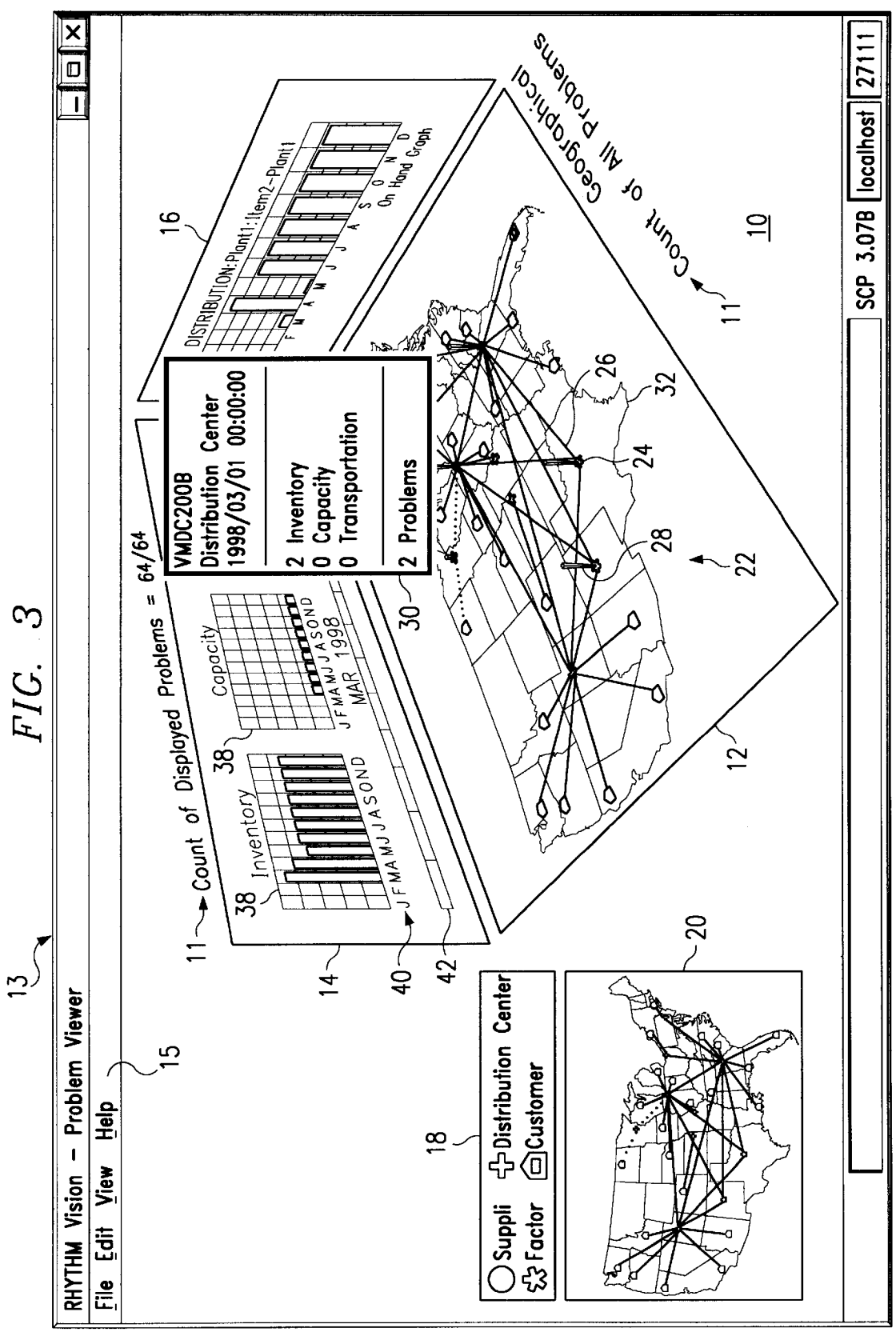
FIG. 3 illustrates an exemplary visual representation of a supply chain demonstrating a pop-up window according to the present invention.

FIG. 3 illustrates an exemplary visual representation 10 of a supply chain demonstrating a pop-up window 30. Visual representation 10 displays pop-up window 30 in response to a user selecting one of entities 24, connectors 26, or bars 28 within physical window 12. Pop-up window 30 shows data associated with selected entity 24, connector 26, or bar 28. In a particular embodiment, a user selects entity 24, connector 26, or bar 28 using a pointer device, such as a mouse, although any suitable input device may be used. In the illustrated embodiment, pop-up window 30 displays data associated with a distribution center. According to pop-up window 30, the selected distribution center has a total of two problems, both inventory problems.

According to the present invention, visual representation 10 may be manipulated in any of the ways used to manipulate standard three-dimensional graphics. For example, visual representation 10 may be rotated along any of three axes, or a user may rearrange physical representation 22 using an input device, such as a mouse, to reveal hidden or obscured data. Furthermore, supply chain entities 24, connectors 26, and bars 28 may be displayed in two or three dimensions.

Although the present invention has been described with several embodiments, a person skilled in the art could make various alterations, modifications, and additions without departing from the spirit and scope of the present invention as defined in the appended claims.

What is claimed is:

1. A computer-related system for visually representing a supply chain, comprising a supply chain physical window operable to display:

a plurality of supply chain entities;

at least one connector between two of the supply chain entities, the connector representing product flow between the two supply chain entities; and at least one supply chain bar adjacent a corresponding supply chain entity and independent of the at least one connector, the supply chain bar providing a non-textual graphical representation, according to the appearance of the supply chain bar, of numerical supply chain data representing one or more measurable values related to the adjacent supply chain entity.

2. The system of claim 1, wherein at least one of the supply chain entities is selected from the group consisting of:

a supplier;

a factory;

a distribution center; and a customer.

3. The system of claim 1, wherein the supply chain physical window is operable to display the supply chain entities in a logical structure according to product flow within the supply chain, positions of the supply chain entities in the logical structure being different than geographic locations of the supply chain entities.

4. The system of claim 1, wherein the supply chain physical window is operable to display the supply chain entities in a geographical structure according to an input map of a geographic area.

5. The system of claim 1, wherein the supply chain physical window is further operable to display the supply chain entities in a combined logical and geographical structure according to product flow between a plurality of input maps of a geographic area.

6. The system of claim 1, wherein the supply chain physical window is further operable to display a three-dimensional rendering of a supply chain entity in response to a user input, the rendering demonstrating an operation of the supply chain entity affecting the supply chain.

7. The system of claim 1, wherein the supply chain physical window is further operable to display a product's movement through the supply chain by highlighting one or more supply chain entities with operations affecting the product.

8. The system of claim 1, wherein the supply chain physical window is further operable to change a characteristic of the supply chain bar in response to the data exceeding a threshold, the characteristic selected from the group consisting of:
   a color; and
   a brightness.

9. The system of claim 1, further comprising a time line including a plurality of time periods, wherein the supply chain physical window is further operable to display a supply chain bar providing data relating to a corresponding supply chain entity for one of the time periods in response to a user selecting the time period from the time line.

10. The system of claim 1, wherein the supply chain physical window is further operable to break the supply chain bar into multiple bars and to aggregate multiple bars into the supply chain bar, at least some of the multiple bars providing data relating to inventory problems, capacity problems, and transportation problems associated with the adjacent supply chain entity.

11. The system of claim 1, wherein the supply chain bar provides data relating to problems associated with the adjacent supply chain entity.

12. The system of claim 1, wherein the supply chain physical window is further operable to display a supply chain bar adjacent the connector and providing a non-textual graphical representation, according to the appearance of the supply chain bar, of data related to the product flow represented by the connector.

13. The system of claim 12, wherein the supply chain physical window displays the supply chain bar adjacent the connector using a cylinder having a diameter in accordance with the data related to the product flow.

14. The system of claim 12, wherein the supply chain bar adjacent the connector provides data relating to transportation resources.

15. The system of claim 1, wherein the supply chain physical window is further operable to update automatically one or more displays in response to a user rescheduling operations at a supply chain entity.

16. The system of claim 1, further comprising a supply chain data summary window operable to display one or more charts according to a view selected by a user, the view selected from a group consisting of:
   a problem view;
   an operational view; and
   a profit view.

17. The system of claim 16, wherein the supply chain physical window and supply chain data summary window are coordinated so that a command is operable to modify automatically both the supply chain physical window and the supply chain data summary window.

18. The system of claim 1, further comprising a supply chain data details window operable to display data relating to a supply chain entity selected from the supply chain physical window.

19. The system of claim 18, wherein the supply chain physical window and supply chain data details window are coordinated so that a command is operable to modify automatically both the supply chain physical window and the supply chain data details window.

20. The system of claim 1, further comprising a supply chain data details window operable to display data relating to a connector selected from the supply chain physical window.

21. The system of claim 1, wherein the supply chain bar further provides textual data related to the adjacent supply chain entity.

22. A computer-related method of visually representing a supply chain, comprising:
   displaying a plurality of supply chain entities in a supply chain physical window;
   representing product flow between two of the supply chain entities by displaying at least one connector between the two supply chain entities; and
   providing a non-textual graphical representation, according to the appearance of the supply chain bar, of numerical supply chain data representing one or more measurable values related to a supply chain entity by displaying at least one supply chain bar adjacent the supply chain entity and independent of the at least one connector.

23. The method of claim 22, wherein at least one of the supply chain entities is selected from the group consisting of:
   a supplier;
   a factory;
   a distribution center; and
   a customer.

24. The method of claim 22, further comprising displaying the supply chain entities in a logical structure according to product flow within the supply chain, positions of the supply chain entities in the logical structure being different than geographic locations of the supply chain entities.

25. The method of claim 22, further comprising displaying the supply chain entities in a geographical structure according to an input map of a geographic area.

26. The method of claim 22, further comprising displaying the supply chain entities in a combined logical and geographical structure according to product flow between a plurality of input maps of a geographic area.

27. The method of claim 22, further comprising displaying a three-dimensional rendering of a supply chain entity in response to a user input, the rendering demonstrating an operation of the supply chain entity affecting the supply chain.

28. The method of claim 22, further comprising highlighting one or more supply chain entities with operations affecting a product to show the product's movement through the supply chain.

29. The method of claim 22, further comprising changing a characteristic of the supply chain bar in response to the data exceeding a threshold, the characteristic selected from the group consisting of:
   a color; and
   a brightness.

30. The method of claim 22, further comprising:
   displaying a time line including a plurality of time periods; and displaying a supply chain bar providing data relating to a corresponding supply chain entity for one of the time periods in response to a user selecting the time period from the time line.

31. The method of claim 22, further comprising:

breaking the supply chain bar into multiple bars, at least some of the multiple bars providing data relating to inventory problems, capacity problems, and transportation problems associated with the adjacent supply chain entity; and aggregating multiple bars into the supply chain bar.

32. The method of claim 22, wherein the supply chain bar provides data relating to problems associated with the adjacent supply chain entity.

33. The method of claim 22, further comprising displaying a supply chain bar adjacent the connector to provide a non-textual graphical representation, according to the appearance of the supply chain bar, of data related to the product flow represented by the connector.

34. The method of claim 33, further comprising displaying the supply chain bar adjacent the connector using a cylinder having a diameter in accordance with the data related to the product flow.

35. The method of claim 33, wherein the supply chain bar adjacent the connector provides data relating to transportation resources.

36. The method of claim 22, further comprising updating automatically one or more displays in response to a user rescheduling operations at a supply chain entity.

37. The method of claim 22, comprising displaying one or more charts in a supply chain data summary window according to a view selected by a user, the view selected from a group consisting of:

a problem view;

an operational view; and a profit view.

38. The method of claim 37, further comprising coordinating the supply chain physical window and supply chain data summary window so that a command is operable to modify automatically both the supply chain physical window and the supply chain data summary window.

39. The method of claim 22, further comprising displaying in a supply chain data details window data relating to a supply chain entity selected from the supply chain physical window.

40. The method of claim 39, further comprising coordinating the supply chain physical window and supply chain data details window so that a command is operable to modify automatically both the supply chain physical window and the supply chain data details window.

41. The method of claim 22, further comprising displaying in a supply chain data details window data relating to a connector selected from the supply chain physical window.

42. The method of claim 22, wherein the supply chain bar further provides textual data related to the adjacent supply chain entity.

43. A computer-related system for visually representing a supply chain, comprising a supply chain physical window operable to display:

a plurality of supply chain entities;

at least one connector between two of the supply chain entities, the connector representing product flow between the two supply chain entities; and at least one supply chain bar adjacent a corresponding supply chain entity and independent of the at least one connector, the supply chain bar providing a non-textual graphical representation, according to the appearance of the supply chain bar, of numerical supply chain data representing one or more measurable values related to the adjacent supply chain entity;

the supply chain bar providing data relating to the adjacent supply chain entity for a time period and, after a relatively brief amount of time, automatically providing data relating to the adjacent supply chain entity for a next chronological time period.

44. A computer-related system for visually representing a supply chain, comprising a supply chain physical window operable to display:

a plurality of supply chain entities;

at least one connector between two of the supply chain entities, the connector representing product flow between the two supply chain entities; and at least one supply chain bar adjacent a corresponding supply chain entity and independent of the at least one connector, the supply chain bar providing a non-textual graphical representation, according to the appearance of the supply chain bar, of data related to the adjacent supply chain entity;

a supply chain bar adjacent the connector and providing a non-textual graphical representation, according to the appearance of the supply chain bar, of data related to the product flow represented by the connector, the supply chain bar adjacent the connector being displayed using a raised line having a height in accordance with the data related to the product flow.

45. A computer-related method of visually representing a supply chain, comprising:

displaying a plurality of supply chain entities in a supply chain physical window;

representing product flow between two of the supply chain entities by displaying at least one connector between the two supply chain entities; and providing a non-textual graphical representation, according to the appearance of the supply chain bar, of data relating to a supply chain entity for a time period by displaying a supply chain bar adjacent the supply chain entity and independent of the at least one connector; and providing a non-textual graphical representation of the data relating to the supply chain entity for a next chronological time period by automatically modifying the supply chain bar after a relatively brief amount of time.

46. A computer-related method of visually representing a supply chain, comprising:

displaying a plurality of supply chain entities in a supply chain physical window;

representing product flow between two of the supply chain entities by displaying at least one connector between the two supply chain entities;

providing a non-textual graphical representation, according to the appearance of the supply chain bar, of data related to a supply chain entity by displaying at least one supply chain bar adjacent the supply chain entity and independent of the at least one connector; and providing a supply chain bar adjacent the connector and providing a non-textual graphical representation, according to the appearance of the supply chain bar, of data related to the product flow represented by the connector, displaying the supply chain bar adjacent the connector using a raised line having a height in accordance with the data related to the product flow.

47. A computer-related system for visually representing a supply chain, comprising a supply chain physical window operable to display:
- a plurality of supply chain entities;
- at least one connector between two of the supply chain entities, the connector representing product flow between the two supply chain entities, the supply chain physical window comprising a plane comprising the at least one connector; and
- at least one supply chain bar adjacent a corresponding supply chain entity and independent of the at least one connector, the supply chain bar providing a non-textual graphical representation, according to the appearance of the supply chain bar, of data related to the adjacent supply chain entity, the supply chain bar extending out of the plane comprising the at least one connector within the supply chain physical window.

48. A computer-related method of visually representing a supply chain, comprising:
- displaying a plurality of supply chain entities in a supply chain physical window;
- representing product flow between two of the supply chain entities by displaying at least one connector between the two supply chain entities, the supply chain physical window comprising a plane comprising the at least one connector; and
- providing a non-textual graphical representation, according to the appearance of the supply chain bar, of data related to a supply chain entity by displaying at least one supply chain bar adjacent the supply chain entity and independent of the at least one connector, the supply chain bar extending out of the plane comprising the at least one connector within the supply chain physical window.

49. Software for visually representing a supply chain, the software being embodied in computer-readable media and when executed operable to generate a display of a supply chain physical window comprising:
- a plurality of supply chain entities;
- at least one connector between two of the supply chain entities, the connector representing product flow between the two supply chain entities; and
- at least one supply chain bar adjacent a corresponding supply chain entity and independent of the at least one connector, the supply chain bar providing a non-textual graphical representation, according to the appearance of the supply chain bar, of numerical supply chain data representing one or more measurable values related to the adjacent supply chain entity.

50. Software for visually representing a supply chain, the software being embodied in computer-readable media and when executed operable to generate a display of a supply chain physical window comprising:
- a plurality of supply chain entities;
- at least one connector between two of the supply chain entities, the connector representing product flow between the two supply chain entities, the supply chain physical window comprising a plane comprising the at least one connector; and
- at least one supply chain bar adjacent a corresponding supply chain entity and independent of the at least one connector, the supply chain bar providing a non-textual graphical representation, according to the appearance of the supply chain bar, of data related to the adjacent supply chain entity, the supply chain bar extending out of the plane comprising the at least one connector within the supply chain physical window.

\* \* \* \* \*